United States Patent
Pu et al.

(10) Patent No.: US 10,844,927 B2
(45) Date of Patent: Nov. 24, 2020

(54) STIFFNESS-ADJUSTABLE ELECTROMAGNETIC SPRING

(71) Applicant: Shanghai University, Shanghai (CN)

(72) Inventors: Huayan Pu, Shanghai (CN); Shujin Yuan, Shanghai (CN); Yi Sun, Shanghai (CN); Min Wang, Shanghai (CN); Jun Luo, Shanghai (CN); Yan Peng, Shanghai (CN); Shaorong Xie, Shanghai (CN); Yi Yang, Shanghai (CN)

(73) Assignee: Shanghai University, Shanghai (CN)

( * ) Notice: Subject to any disclaimer, the term of this patent is extended or adjusted under 35 U.S.C. 154(b) by 150 days.

(21) Appl. No.: 16/290,258

(22) Filed: Mar. 1, 2019

(65) Prior Publication Data
US 2020/0208711 A1     Jul. 2, 2020

(30) Foreign Application Priority Data

Dec. 27, 2018   (CN) .......................... 2018 1 1609594

(51) Int. Cl.
| | |
|---|---|
| *H01F 3/00* | (2006.01) |
| *F16F 15/03* | (2006.01) |
| *F16F 6/00* | (2006.01) |

(52) U.S. Cl.
CPC ............. *F16F 15/03* (2013.01); *F16F 6/00* (2013.01); *F16F 2228/066* (2013.01)

(58) Field of Classification Search
CPC ..................................... F16F 15/03; F16F 6/00
(Continued)

(56) References Cited

U.S. PATENT DOCUMENTS

| | | | | |
|---|---|---|---|---|
| 3,126,501 A | * | 3/1964 | Flora ..................... | H01F 7/1615 |
| | | | | 361/194 |
| 5,947,155 A | * | 9/1999 | Miki .................. | G05D 16/2024 |
| | | | | 137/625.65 |

(Continued)

FOREIGN PATENT DOCUMENTS

| | | |
|---|---|---|
| CN | 1042974 | 6/1990 |
| CN | 103511529 | 10/2013 |

(Continued)

*Primary Examiner* — Alexander Talpalatski
(74) *Attorney, Agent, or Firm* — IP Attorneys Group, LLC

(57) ABSTRACT

The present invention discloses a stiffness-adjustable electromagnetic spring. The spring includes a central shaft, an intermediate electromagnetic force control component, and two end electromagnetic force control components, where the two end electromagnetic force control components are located on both sides of the intermediate electromagnetic force control component, the two end electromagnetic force control components and the intermediate electromagnetic force control component are both sleeved on the central shaft, and the intermediate electromagnetic force control component is coaxial with the two end electromagnetic force control components. The stiffness of the electromagnetic spring can be controlled online and the nonlinearity can be adjusted. The spring disclosed in the present invention can generate adjustable negative stiffness to decrease the dynamic stiffness without reducing the static stiffness, thus break through the limitation of carrying capability of the spring on the vibration isolation performance, and has characteristics of compact structure, fast response, and easy control.

8 Claims, 2 Drawing Sheets

(58) Field of Classification Search
USPC .......................................... 335/256, 252, 277
See application file for complete search history.

(56) References Cited

U.S. PATENT DOCUMENTS

| | | | | |
|---|---|---|---|---|
| 6,819,209 | B2 * | 11/2004 | Yajima ................... | F16F 15/03 |
| | | | | 335/257 |
| 6,983,923 | B2 * | 1/2006 | Fukui .................. | A61B 5/0235 |
| | | | | 251/65 |
| 7,981,107 | B2 * | 7/2011 | Olsen ................ | A61M 5/14276 |
| | | | | 604/891.1 |
| 2014/0354381 | A1 * | 12/2014 | Kohlhafer ............... | H01F 7/081 |
| | | | | 335/179 |

FOREIGN PATENT DOCUMENTS

| | | |
|---|---|---|
| CN | 205207526 | 11/2015 |
| CN | 105840727 | 5/2016 |
| KR | 2012101864 | 7/2012 |

* cited by examiner

STIFFNESS-ADJUSTABLE ELECTROMAGNETIC SPRING

This application claims priority to Chinese application number 201811609594.0, filed Dec. 27, 2018, with a title of STIFFNESS-ADJUSTABLE ELECTROMAGNETIC SPRING. The above-mentioned patent application is incorporated herein by reference in its entirety.

TECHNICAL FIELD

The present invention relates to the field of vibration control technologies, and in particular, to a stiffness-adjustable electromagnetic spring.

BACKGROUND

A spring is a core component of a vibration system, and its stiffness directly determines the performance of vibration control. A stiffness-adjustable element can change natural frequency and damping ratio of the system, and resolve a problem that adjustable damping is only effective for a specific frequency band, and plays an irreplaceable role in semi-active vibration control. The natural frequency of the system can be reduced by reducing the stiffness of the spring, so as to extend the vibration isolation frequency band and improve the vibration isolation performance. However, a conventional stiffness-adjustable element can only produce positive stiffness, so that the lower limit of stiffness generated by the conventional stiffness-adjustable element cannot be excessively low due to the limitation of carrying capability, which also makes it difficult to meet requirements of ultra-low frequency vibration isolation. Common springs all produce positive stiffness, and for this spring, a load increment is in the same direction as the deformation increment. That negative stiffness is opposite to positive stiffness means a characteristic that a load increment is opposite to a deformation increment. A vibration isolator with high static stiffness and low dynamic stiffness can be designed by connecting a negative stiffness element and a positive stiffness element in parallel, to improve the vibration isolation performance without reducing a carrying capability. However, at present, most negative stiffness elements have non-linearity, which may lead to nonlinear behavior under large excitation and make the isolation performance worse.

SUMMARY

An objective of the present invention is to provide a stiffness-adjustable electromagnetic spring, which has characteristics of compact structure, fast response, easy control, generable negative stiffness, adjustable nonlinearity of stiffness, so that it can be introduced in adjustable high static low dynamic stiffness isolator for good vibration isolation performance.

To achieve the above purpose, the present invention provides the following solution.

A stiffness-adjustable electromagnetic spring includes a central shaft, an intermediate electromagnetic force control component, and two end electromagnetic force control components, where the two end electromagnetic force control components are located on both sides of the intermediate electromagnetic force control component, the two end electromagnetic force control components and the intermediate electromagnetic force control component are both sleeved on the central shaft, and the intermediate electromagnetic force control component is coaxial with the two end electromagnetic force control components;

the intermediate electromagnetic force control component includes an intermediate coil, a ring magnet, and an intermediate controllable power supply, the ring magnet is coaxially fastened to the central shaft, and the intermediate coil is coaxially sleeved on the ring magnet; the intermediate controllable power supply is connected to the intermediate coil; and the intermediate controllable power supply is configured to supply power to the intermediate coil, and control the electromagnetic force of the intermediate coil on the ring magnet by adjusting the current $I_1$ in the intermediate coil;

the two end electromagnetic force control components include a two-end controllable power supply, a first coil disposed on one side of the intermediate electromagnetic force control component, and a second coil disposed on the other side of the intermediate electromagnetic force control component, where the first coil is connected to the second coil in series, the first coil and the second coil are coaxially sleeved on the central shaft, and axial positions of the first coil and the second coil are symmetrical with respect to the intermediate coil; the two-end controllable power supply is connected to both the first coil and the second coil; and the two-end controllable power supply is configured to supply power to the first coil and the second coil, and control the electromagnetic forces of the first coil and the second coil on the ring magnet by adjusting current $I_2$ in the first coil and second coil.

the current $I_1$ and the current $I_2$ are regulated to adjust electromagnetic forces generated by the intermediate electromagnetic force control component and the two end electromagnetic force control components, so as to implement stiffness adjustment and nonlinearity adjustment of the stiffness-adjustable electromagnetic spring.

Optionally, the stiffness-adjustable electromagnetic spring further includes a first fixed ring and a second fixed ring; the first fixed ring is tightly attached to one end face of the ring magnet, and the second fixed ring is tightly attached to the other end face of the ring magnet, and the ring magnet is fastened to the central shaft through the first fixed ring and the second fixed ring; and the first fixed ring, the second fixed ring, and the ring magnet axially move together with the central shaft.

Optionally, the stiffness-adjustable electromagnetic spring further includes an intermediate support; the intermediate support includes an intermediate base platform, an intermediate vertical support part, and an intermediate coil connection part; the intermediate vertical support part is vertically disposed on an upper surface of the intermediate base platform; the intermediate coil connection part is disposed above the intermediate vertical support part, and is in a same vertical surface as the intermediate vertical support part; the intermediate coil connection part is of a circular tube-like structure; and the intermediate coil is disposed inside a circular tube of the intermediate coil connection part, so that there is a gap between the intermediate coil and the ring magnet.

Optionally, the stiffness-adjustable electromagnetic spring further includes a first support and a second support, and the first support and the second support have a same structure including an end bottom platform, an end vertical support part, and an end coil connection part; the end vertical support part is vertically disposed on an upper surface of the end bottom platform, and the end coil connection part and the end vertical support part are vertically disposed; and the end coil connection part is of a circular tube-like structure, and an outer wall of a cylinder of the end coil connection part is connected to the first coil and the second coil.

Optionally, the stiffness-adjustable electromagnetic spring further includes a first linear bearing and a second linear bearing; the first linear bearing is arranged inside a cylinder of a coil connection part of the first support; the second linear bearing is arranged inside a cylinder of a coil connection part of the second support; and the central shaft passes through the first linear bearing and the second linear bearing, and the first linear bearing and the second linear bearing are configured to limit the central shaft for only axial movement.

Optionally, the intermediate base platform, an end bottom platform of the first support, and an end bottom platform of the second support are fastened to a same plane; and relative positions of the first coil, the second coil, and the intermediate coil are fixed, and the first coil and the second coil are coaxial with the intermediate coil.

Optionally, the axial length of the intermediate coil is equal to the axial length of the ring magnet.

Optionally, the intermediate controllable power supply and the two-end controllable power supply can be implemented by using a data acquisition card outputs a signal and a power amplifier outputs a current to implement direct control by using a computer.

According to specific embodiments provided in the present invention, the present invention discloses the following technical effects: According to the stiffness-adjustable electromagnetic spring provided in the present invention, an intermediate controllable power supply to control the electromagnetic force of an intermediate coil on a ring magnet and a two-end controllable power supply to control the electromagnetic forces of a first coil and a second coil on the ring magnet, are used to adjust stiffness of the electromagnetic spring online. The process is easy to control. The stiffness-adjustable electromagnetic spring disclosed in the present invention can generate negative stiffness, and an adjustable vibration isolator with high static stiffness and low dynamic stiffness can be designed by connecting this negative stiffness element and a common positive stiffness element in parallel, thereby breaking through a limitation of carrying capability and greatly improving the vibration isolation performance. In addition, the negative stiffness element has adjustable non-linearity and wide adaptability, so that the vibration isolator can meet more use conditions. In addition, the present invention also has characteristics of compact structure and fast response.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

1. First support; 2. first coil; 3. central shaft; 4. first linear bearing; 5. two-end controllable power supply; 6. first fixed ring; 7. intermediate controllable power supply; 8. intermediate support; 9. intermediate coil; 10. ring magnet; 11. second fixed ring; 12. second linear bearing; 13. second coil; 14. second support.

DETAILED DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a stiffness-adjustable electromagnetic spring, which has characteristics of compact structure, fast response, easy control, generable negative stiffness, adjustable nonlinearity of stiffness, so that it can be introduced in adjustable high static low dynamic stiffness isolator for good vibration isolation performance.

To make the foregoing objective, features, and advantages of the present invention clearer and more comprehensible, the present invention is further described in detail below with reference to the accompanying drawings and specific embodiments.

Figure 1:
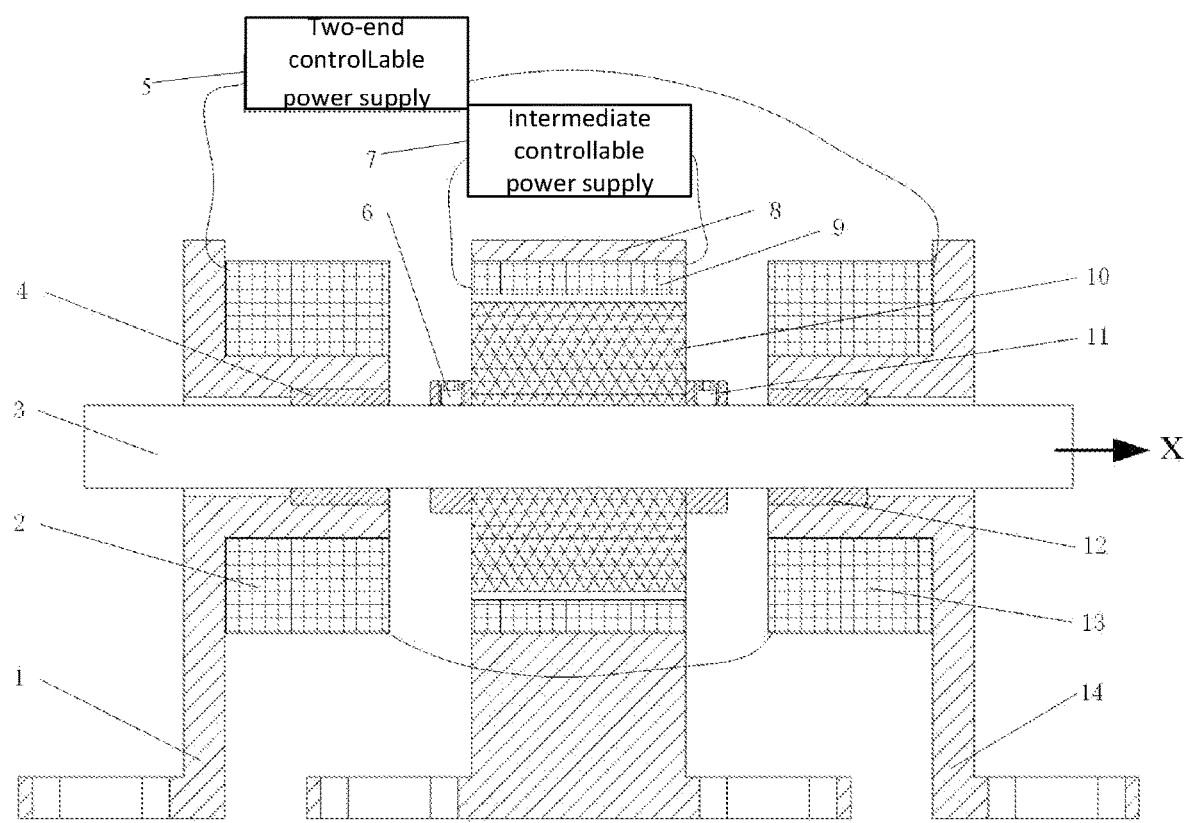
FIG. 1 is a structure chart of a stiffness-adjustable electromagnetic spring according to an embodiment of the present invention.

FIG. 1 is a structure chart of a stiffness-adjustable electromagnetic spring according to an embodiment of the present invention. As shown in FIG. 1, the stiffness-adjustable electromagnetic spring provided in the present invention includes a central shaft 3, an intermediate electromagnetic force control component, and two end electromagnetic force control components, where the two end electromagnetic force control components are located on both sides of the intermediate electromagnetic force control component, the two end electromagnetic force control components and the intermediate electromagnetic force control component are both sleeved on the central shaft 3, and the intermediate electromagnetic force control component is coaxial with the two end electromagnetic force control components.

The intermediate electromagnetic force control component includes an intermediate coil 9, a ring magnet 10, and an intermediate controllable power supply 7, the ring magnet 10 is coaxially fastened to the central shaft 3, the intermediate coil 9 and the ring magnet 10 are coaxially sleeved on the central shaft 3; the intermediate controllable power supply 7 is connected to the intermediate coil 9; and the intermediate controllable power supply 7 is configured to supply power to the intermediate coil 9, and control, by adjusting a current $I_1$ in the intermediate coil 9, an electromagnetic force of the intermediate coil 9 on the ring magnet 10.

The two end electromagnetic force control components includes a two-end controllable power supply 5, a first coil 2 disposed on one side of the intermediate electromagnetic force control component, and a second coil 13 disposed on the other side of the intermediate electromagnetic force control component, where the first coil 2 is connected to the second coil 13 in series, the first coil 2 and the second coil 13 are coaxially sleeved on the central shaft 3, and axial positions of the first coil 2 and the second coil 13 are symmetrical with respect to the intermediate coil 9; the two-end controllable power supply 5 is connected to both the first coil 2 and the second coil 13; and the two-end controllable power supply 5 is configured to supply power to the first coil 2 and the second coil 13, and control the electromagnetic forces of the first coil 2 and the second coil 13 on the ring magnet 10 by adjusting currents $I_2$ in the first coil 2 and the second coil 13.

The current $I_1$ and the current $I_2$ are regulated to adjust electromagnetic forces generated by the intermediate electromagnetic force control component and the two end electromagnetic force control components, so as to implement stiffness adjustment and the nonlinearity adjustment of the stiffness-adjustable electromagnetic spring.

The stiffness-adjustable electromagnetic spring further includes a first fixed ring 6 and a second fixed ring 11; the first fixed ring 6 is tightly attached to one end face of the ring magnet 10, and the second fixed ring 11 is tightly attached to the other end face of the ring magnet 10, and the ring magnet 10 is fastened to the central shaft 3 through the first fixed ring 6 and the second fixed ring 11; and the first fixed ring 6, the second fixed ring 11, and the ring magnet 10 axially move together under the drive of the central shaft 3.

The stiffness-adjustable electromagnetic spring further includes an intermediate support 8; the intermediate support 8 includes an intermediate base platform, an intermediate vertical support part, and an intermediate coil connection part; the intermediate vertical support part is vertically disposed on an upper surface of the intermediate base platform; the intermediate coil connection part is disposed above the intermediate vertical support part, and is in a same vertical surface as the intermediate vertical support part; the intermediate coil connection part is of a circular tube-like structure; and the intermediate coil 9 is disposed inside a circular tube of the intermediate coil connection part. There is a gap between the intermediate coil 9 and the ring magnet 10, to prevent friction between the intermediate coil 9 and the ring magnet 10.

The stiffness-adjustable electromagnetic spring further includes a first support 1 and a second support 14, where the first support 1 and the second support 14 have a same structure, and the first support 1 and the second support 14 each include an end bottom platform, an end vertical support part, and an end coil connection part; the end vertical support part is vertically disposed on an upper surface of the end bottom platform, and the end coil connection part and the end vertical support part are vertically disposed; and the end coil connection part is of a circular tube-like structure, and an outer wall of a cylinder of the end coil connection part is connected to both the first coil 2 and the second coil 13.

The stiffness-adjustable electromagnetic spring further includes a first linear bearing 4 and a second linear bearing 12; the first linear bearing 4 is arranged inside a cylinder of a coil connection part of the first support 1; the second linear bearing 12 is arranged inside a cylinder of a coil connection part of the second support 14; and the central shaft 3 passes through the first linear bearing 4 and the second linear bearing 12, and the first linear bearing 4 and the second linear bearing 12 are configured to limit the central shaft 3 for only axial movement.

The intermediate base platform of the intermediate support 8 of the stiffness-adjustable electromagnetic spring, an end bottom platform of the first support 1, and an end bottom platform of the second support 14 are fastened to a same plane; and relative positions of the first coil 2, the second coil 13, and the intermediate coil 9 are fixed, and the first coil 2 and the second coil 13 are coaxial with the intermediate coil 9.

An axial length of the intermediate coil 9 of the stiffness-adjustable electromagnetic spring is equal to an axial length of the ring magnet 10.

The intermediate controllable power supply 7 and the two-end controllable power supply 5 of the stiffness-adjustable electromagnetic spring are implemented by using a data acquisition card outputs a signal and a power amplifier outputs a current to implement direct control by using a computer.

Figure 2:
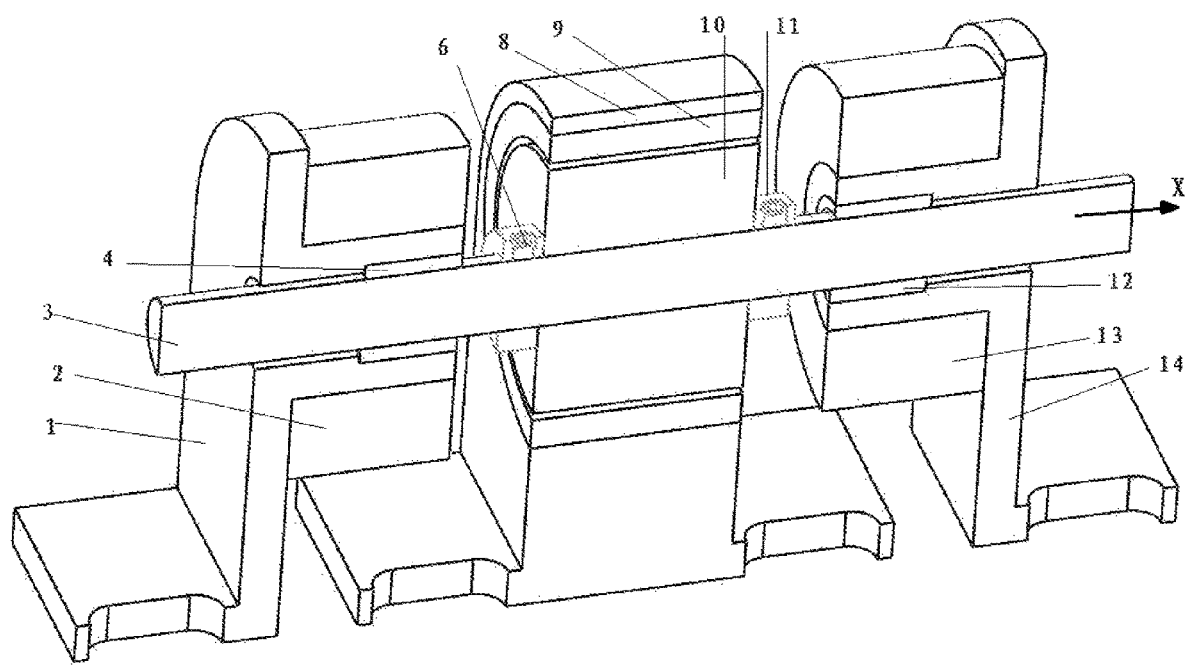
FIG. 2 is an oblique section view of a stiffness-adjustable electromagnetic spring according to an embodiment of the present invention.

FIG. 2 is an oblique section view of a stiffness-adjustable electromagnetic spring according to an embodiment of the present invention. The following describes in detail a stiffness adjustment principle of the stiffness-adjustable spring with reference to FIG. 2.

When a relative displacement between a ring magnet 10 and an intermediate coil 9 is 0, a first end face and a second end face of the ring magnet 10 are flush with two end faces of the intermediate coil 9. In this case, a space between a first coil 2 and the ring magnet 10 is equal to a space between a second coil 13 and the ring magnet 10, an electromagnetic field formed by the first coil 2, the second coil 13, the intermediate coil 9, and the ring magnet 10 is symmetrical, and a resultant electromagnetic force on the ring magnet 10 is 0.

When the relative displacement between the ring magnet 10 and the intermediate coil 9 is x, the resultant electromagnetic force on the ring magnet 10 is not 0, according to a relationship between an electromagnetic force on the ring magnet 10 and the relative displacement between the ring magnet 10 and the intermediate coil 9, a relationship between stiffness of the stiffness-adjustable electromagnetic spring and the relative displacement between the ring magnet 10 and the intermediate coil 9 is obtained. The relationship between the stiffness of the stiffness-adjustable electromagnetic spring and the relative displacement of the ring magnet 10 is expressed as follows:

$$K=A(I_1,I_2)+B(I_1,I_2)\times x^2;$$

K is the stiffness of the stiffness-adjustable electromagnetic spring, a constant term A and a quadratic term coefficient B are controlled by a current $I_1$ and a current $I_2$, and x is the relative displacement between the ring magnet 10 and the intermediate coil 9.

The current $I_1$ and the current $I_2$ are adjusted by an intermediate controllable power supply 7 and a two-end controllable power supply 5, to make the quadratic term coefficient B be 0, so as to implement linear stiffness adjustment of the stiffness-adjustable electromagnetic spring. The current $I_1$ and the current $I_2$ are adjusted by the intermediate controllable power supply 7 and the two-end controllable power supply 5, to make the constant term A a negative value, so as to obtain an electromagnetic spring with negative stiffness.

Specifically, impact of a current on a stiffness coefficient is related to a coil size. In a spring obtained for a design objective of enlarging an adjustable range of a spring with linear negative stiffness, a size of the magnet is an inner diameter 10 mm, an outer diameter 35 mm, and an axial length 26 mm; a size of the intermediate coil is an inner diameter 37, an outer diameter 44 mm, and a length 26 mm; and a size of an end coil is an inner diameter 22 mm, an outer diameter 45 mm, and a length 20 mm. In this case, the constant term A and the quadratic term coefficient B are respectively expressed as follows:

$$A(I_1,I_2)=0.68\times10^3\times I_1-1.08\times10^3\times I_2;$$

$$B(I_1,I_2)=-4\times10^6\times I_1-4\times10^6\times I_2;$$

For this spring, $I_1$ and $I_2$ are adjusted to make $I_1<1080I_2/688$, so that the constant term A may be less than 0, and a spring with negative stiffness is obtained.

Let $I_1=-I_2$, so that the quadratic term coefficient B may be 0, and a linear spring is obtained. In addition, let $I_1<0$, so that the constant term A may be less than 0, and a spring with linear stiffness is obtained.

The stiffness-adjustable electromagnetic spring in the present invention can form negative stiffness, and an adjustable vibration isolator with high static stiffness and low dynamic stiffness can be designed by connecting the negative stiffness element and a common positive stiffness element in parallel, thereby breaking through a limitation of a carrying capability and greatly improving the vibration isolation performance. In addition, the negative stiffness element has adjustable non-linearity and wide adaptability, so that the vibration isolator can meet more use conditions. In addition, the present invention has characteristics of compact structure and fast response.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A stiffness-adjustable electromagnetic spring, comprising a central shaft, an intermediate electromagnetic force control component, and two end electromagnetic force control components, wherein the two end electromagnetic force control components are located on both sides of the intermediate electromagnetic force control component, the two end electromagnetic force control components and the intermediate electromagnetic force control component are both sleeved on the central shaft, and the intermediate electromagnetic force control component is coaxial with the two end electromagnetic force control components;

the intermediate electromagnetic force control component comprises an intermediate coil, a ring magnet, and an intermediate controllable power supply, the ring magnet is coaxially fastened to the central shaft, and the intermediate coil is coaxially sleeved on the ring magnet; the intermediate controllable power supply is connected to the intermediate coil; and the intermediate controllable power supply is configured to supply power to the intermediate coil, and control the electromagnetic force of the intermediate coil on the ring magnet by adjusting the current $I_1$ in the intermediate coil;

the two end electromagnetic force control components comprise a two-end controllable power supply, a first coil disposed on one side of the intermediate electromagnetic force control component, and a second coil disposed on the other side of the intermediate electromagnetic force control component, wherein the first coil is connected to the second coil in series, the first coil and the second coil are coaxially sleeved on the central shaft, and axial positions of the first coil and the second coil are symmetrical with respect to the intermediate coil; the two-end controllable power supply is connected to both the first coil and the second coil; and the two-end controllable power supply is configured to supply power to the first coil and the second coil, and control the electromagnetic forces of the first coil and the second coil on the ring magnet by adjusting current $I_2$ in the first coil and second coil; and the current $I_1$ and the current $I_2$ are regulated to adjust electromagnetic forces generated by the intermediate electromagnetic force control component and the two end electromagnetic force control components, so as to implement stiffness adjustment and nonlinearity adjustment of the stiffness-adjustable electromagnetic spring.

2. The stiffness-adjustable electromagnetic spring according to claim 1, wherein the stiffness-adjustable electromagnetic spring further comprises a first fixed ring and a second fixed ring; the first fixed ring is tightly attached to one end face of the ring magnet, and the second fixed ring is tightly attached to the other end face of the ring magnet, and the ring magnet is fastened to the central shaft through the first fixed ring and the second fixed ring; and the first fixed ring, the second fixed ring, and the ring magnet axially move together with the central shaft.

3. The stiffness-adjustable electromagnetic spring according to claim 2, wherein the stiffness-adjustable electromagnetic spring further comprises an intermediate support; the intermediate support comprises an intermediate base platform, an intermediate vertical support part, and an intermediate coil connection part; the intermediate vertical support part is vertically disposed on an upper surface of the intermediate base platform; the intermediate coil connection part is disposed above the intermediate vertical support part, and is in a same vertical surface as the intermediate vertical support part; the intermediate coil connection part is of a circular tube-like structure; and the intermediate coil is disposed inside a circular tube of the intermediate coil connection part, so that there is a gap between the intermediate coil and the ring magnet.

4. The stiffness-adjustable electromagnetic spring according to claim 3, wherein the stiffness-adjustable electromagnetic spring further comprises a first support and a second support, and the first support and the second support have a same structure including an end bottom platform, an end vertical support part, and an end coil connection part; the end vertical support part is vertically disposed on an upper surface of the end bottom platform, and the end coil connection part and the end vertical support part are vertically disposed; and the end coil connection part is of a circular tube-like structure, and an outer wall of a cylinder of the end coil connection part is connected to the first coil and the second coil.

5. The stiffness-adjustable electromagnetic spring according to claim 4, wherein the stiffness-adjustable electromagnetic spring further comprises a first linear bearing and a second linear bearing; the first linear bearing is arranged inside a cylinder of a coil connection part of the first support; the second linear bearing is arranged inside a cylinder of a coil connection part of the second support; and the central shaft passes through the first linear bearing and the second linear bearing, and the first linear bearing and the second linear bearing are configured to limit the central shaft for only axial movement.

6. The stiffness-adjustable electromagnetic spring according to claim 4, wherein the intermediate base platform, an end bottom platform of the first support, and an end bottom platform of the second support are fastened to a same plane; and relative positions of the first coil, the second coil, and the intermediate coil are fixed, and the first coil and the second coil are coaxial with the intermediate coil.

7. The stiffness-adjustable electromagnetic spring according to claim 1, wherein the axial length of the intermediate coil is equal to the axial length of the ring magnet.

8. The stiffness-adjustable electromagnetic spring according to claim 1, wherein the intermediate controllable power supply and the two-end controllable power supply can be implemented by using a data acquisition card outputs a signal and a power amplifier outputs a current to implement direct control by using a computer.

\* \* \* \* \*